US010527467B2

(12) United States Patent
Nishioka et al.

(10) Patent No.: US 10,527,467 B2
(45) Date of Patent: Jan. 7, 2020

(54) ROTATION ANGLE DETECTOR WHICH CAN DETECT ENTRY OF FOREIGN SUBSTANCES

(71) Applicant: FANUC CORPORATION, Minamitsuru-gun, Yamanashi (JP)

(72) Inventors: Akira Nishioka, Yamanashi (JP); Shunichi Odaka, Yamanashi (JP); Keisuke Imai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 480 days.

(21) Appl. No.: 15/177,812

(22) Filed: Jun. 9, 2016

(65) Prior Publication Data
US 2016/0363469 A1 Dec. 15, 2016

(30) Foreign Application Priority Data

Jun. 10, 2015 (JP) ................................. 2015-117650

(51) Int. Cl.
G01D 18/00 (2006.01)
G01D 5/12 (2006.01)
G01D 5/347 (2006.01)
G01D 5/244 (2006.01)
G01D 5/245 (2006.01)

(52) U.S. Cl.
CPC ............... G01D 18/00 (2013.01); G01D 5/12 (2013.01); G01D 5/2452 (2013.01); G01D 5/24461 (2013.01); G01D 5/3473 (2013.01)

(58) Field of Classification Search
CPC ...... G01D 18/00; G01D 5/12; G01D 5/24461; G01D 5/2452; G01D 5/3473
See application file for complete search history.

(56) References Cited

U.S. PATENT DOCUMENTS

| | | | | |
|---|---|---|---|---|
| 6,330,522 | B1 * | 12/2001 | Takeuchi | G01D 5/347 180/400 |
| 6,492,911 | B1 | 10/2002 | Netzer | |
| 7,119,532 | B2 | 10/2006 | Nihei et al. | |
| 8,446,596 | B2 | 5/2013 | Yamamoto et al. | |
| 8,546,743 | B2 | 10/2013 | Fujita | |
| 2003/0023400 | A1 * | 1/2003 | Sanpei | B62D 15/02 702/151 |
| 2010/0076643 | A1 | 3/2010 | Kim | |

(Continued)

FOREIGN PATENT DOCUMENTS

| | | |
|---|---|---|
| CN | 1171560 A | 1/1998 |
| CN | 1347493 A | 5/2002 |

(Continued)

Primary Examiner — Georgia Y Epps
Assistant Examiner — Don Williams
(74) Attorney, Agent, or Firm — RatnerPrestia

(57) ABSTRACT

A rotation angle detector comprises a rotating body including a plurality of track parts, and an abnormality detecting unit for detecting an abnormality based on signals generated in detection units. The detection units generate a first signal based on a first track part and a second signal based on a second track part. The abnormality detecting unit includes a judgement unit for judging an occurrence of an abnormality when the difference between the fluctuation range of the first signal and the fluctuation range of the second signal is larger than a predetermined fluctuation range judgement value.

3 Claims, 11 Drawing Sheets

(56) References Cited

U.S. PATENT DOCUMENTS

| | | |
|---|---|---|
| 2011/0041585 A1 | 2/2011 | Hiller et al. |
| 2012/0143520 A1* | 6/2012 | Oowada ............... G01D 5/2073 702/35 |
| 2013/0241570 A1* | 9/2013 | Okamoto ........... G01R 31/2841 324/537 |

FOREIGN PATENT DOCUMENTS

| | | |
|---|---|---|
| CN | 1550782 A | 12/2004 |
| JP | 02290510 A | 11/1990 |
| JP | H 0666594 A | 3/1994 |
| JP | 0719899 A | 1/1995 |
| JP | 2000065604 A | 3/2000 |
| JP | 2004245794 A | 9/2004 |
| JP | 2005-147733 A | 6/2005 |
| JP | 2005351654 A | 12/2005 |
| JP | 2006266727 A | 10/2006 |
| JP | 2008030897 A | 2/2008 |
| JP | 2010085254 A | 4/2010 |
| JP | 2010-266260 A | 11/2010 |
| JP | 2011107106 A | 6/2011 |
| JP | 2013134203 A | 7/2013 |
| JP | 2013156062 A | 8/2013 |
| JP | 2014215114 A | 11/2014 |

\* cited by examiner

ROTATION ANGLE DETECTOR WHICH CAN DETECT ENTRY OF FOREIGN SUBSTANCES

BACKGROUND OF THE INVENTION

1. Field of the Invention

The present invention relates to a rotation angle detector for detecting the rotation angle of a rotary shaft.

2. Description of the Related Art

In machine tools or robots, a rotation angle detector is attached to, for example, an output shaft of a drive motor, in order to detect the actual position of a tool or hand. As such a rotation angle detector, an optical detector or a magnetic detector has been known. The rotation angle detector comprises a rotating body. The rotating body has track parts in which slits or magnetic elements are circumferentially arranged. The rotation angle detector can detect the rotation angle of a rotary shaft by detecting varying signals using the track parts.

In conventional arts, devices for detecting failures of a rotation angle detector have been known. For example, Japanese Unexamined Patent Publication No. 2010-266260 discloses an abnormality monitoring device which determines that there is a failure when the amplitudes of a plurality of signals fall below a predetermined threshold value. Further, Japanese Unexamined Patent Publication No. 2005-147733 discloses an abnormality detecting device which determines that there is a failure when the voltage values of signals of different phases are identical, and electrical angles are different from the previously stored normal electrical angle.

In the devices disclosed in these publications, abnormalities can be detected only after normal operations cannot be performed due to, for example, breaking of wires. If parts necessary for repair are ordered after a rotation angle detector fails to operate properly, there is a problem that a long time may be taken to restore the rotation angle detector. Alternatively, the parts necessary for repair may be store beforehand. However, there is a problem that a large amount of effort may be required to manage the parts, or a space for storage of a lot of parts for repair may be necessary.

On the other hand, Japanese Unexamined Patent Publication No. 06-66594 discloses a position detector in which a plurality of threshold values are set for the amplitudes of a plurality of signals so as to detect an abnormality. The position detector can predict the possibility of failures before the position detector fails to operate properly.

It is preferable that failures of a rotation angle detector are quickly detected. Examples of the causes of failures of the rotation angle detector include breaking of cables, electrical noise, and entry of foreign substances.

In conventional arts, it is difficult to identify these causes of failures. Thus, it is difficult to properly perform a repair after a complete failure is achieved. For example, it is difficult to identify the cause of a failure, and accordingly, the failure may occur again after the rotation angle detector is repaired. It is preferable that the possibility of a failure can be detected in early stages in order to identify the cause of the failure.

In particular, examples of foreign substances which may enter a rotation angle detector include liquid foreign substances, such as lubrication oil, cutting fluid, etc. and solid foreign substances, such as chips etc. A failure caused by entry of foreign substances into a rotation angle detector can cause a major failure, such as corrosion of parts caused by cutting fluid or breakage of parts caused by chips. Thus, it is preferable that the entry of foreign substances into a rotation angle detector can be detected in early stages.

SUMMARY OF INVENTION

A rotation angle detector according to the present invention comprises a rotating body including a plurality of track parts to detect a rotation angle of a rotary shaft, detection units arranged in positions which corresponds to the track parts, and an abnormality detecting unit for detecting an abnormality based on signals generated in the detection units. The rotating body includes a first track part and a second track part. The detection units generate a first signal based on the first track part and a second signal based on the second track part. The abnormality detecting unit includes a fluctuation range calculating unit for calculating a fluctuation range of the first signal and a fluctuation range of the second signal. The abnormality detecting unit includes a judgement unit for judging an occurrence of an abnormality when a difference between the fluctuation range of the first signal and the fluctuation range of the second signal is larger than a predetermined fluctuation range judgement value.

In the above invention, the rotation angle detector can be provided with a phase detecting unit for detecting a phase within one revolution of the rotary shaft. The abnormality detecting unit can detect a phase in which the difference between the fluctuation range of the first signal and the fluctuation range of the second signal exceeds a fluctuation range judgement value. The judgement unit can judge that an abnormality occurs when the difference between the fluctuation range of the first signal and the fluctuation range of the second signal exceeds a fluctuation range judgement value in the same phase when the rotary shaft rotates more than once.

In the above invention, the abnormality detecting unit can include a correction unit for correcting signals generated in the detection units, and a storage unit for storing beforehand a correction value which causes the fluctuation range of the first signal and the fluctuation range of the second signal to be identical to each other when the rotation angle detector is in a normal state. The correction unit can use the correction value so as to correct at least one fluctuation range among the fluctuation range of the first signal and the fluctuation range of the second signal. The judgement unit can make a judgement based on the first signal and the second signal after correction.

DETAILED DESCRIPTION

Embodiment 1

With reference to FIGS. 1 to 6, a rotation angle detector in embodiment 1 will be described below. The rotation angle detector is a detector for detecting the rotation angle of an arbitrary rotary shaft. The rotation angle detector is attached to a rotary shaft, such as an output shaft of a motor or a shaft for transmitting a rotation force. In the present embodiment, a rotation angle detector of incremental type for detecting the angle of rotation from a predetermined position is shown as an example.

Figure 1:
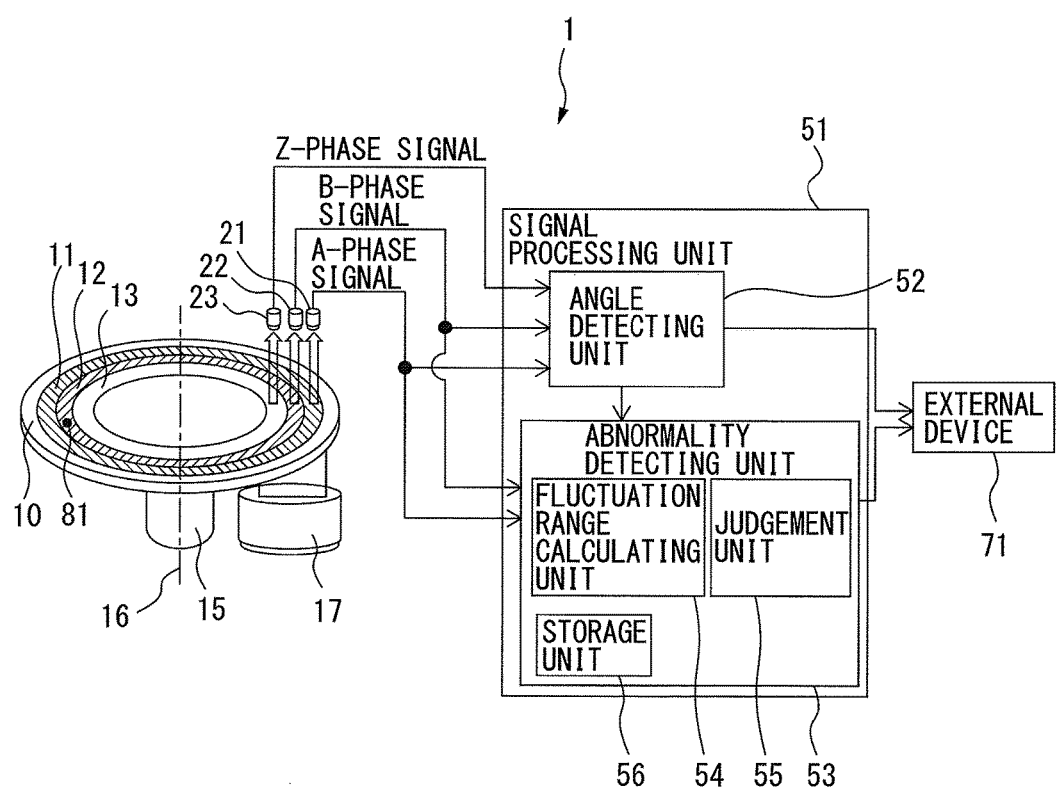
FIG. 1 is a schematic diagram of a first rotation angle detector in embodiment 1.

FIG. 1 shows a schematic diagram of a first rotation angle detector in the present embodiment. The first rotation angle detector is an optical detector. A rotation angle detector 1 is attached to a rotary shaft 15. The rotary shaft 15 rotates about an axis 16.

The rotation angle detector 1 includes a rotating plate 10 secured to the rotary shaft 15. The rotating plate 10 functions as a rotating body to detect the rotation angle of the rotary shaft 15. The rotating plate 10 has a circular planar shape. The rotating plate 10 is secured to the rotary shaft 15 so that a surface of the rotating plate 10, which has the maximum area, is perpendicular to the extending direction of the rotary shaft 15. The rotating plate 10 rotates along with the rotary shaft 15.

Figure 2:
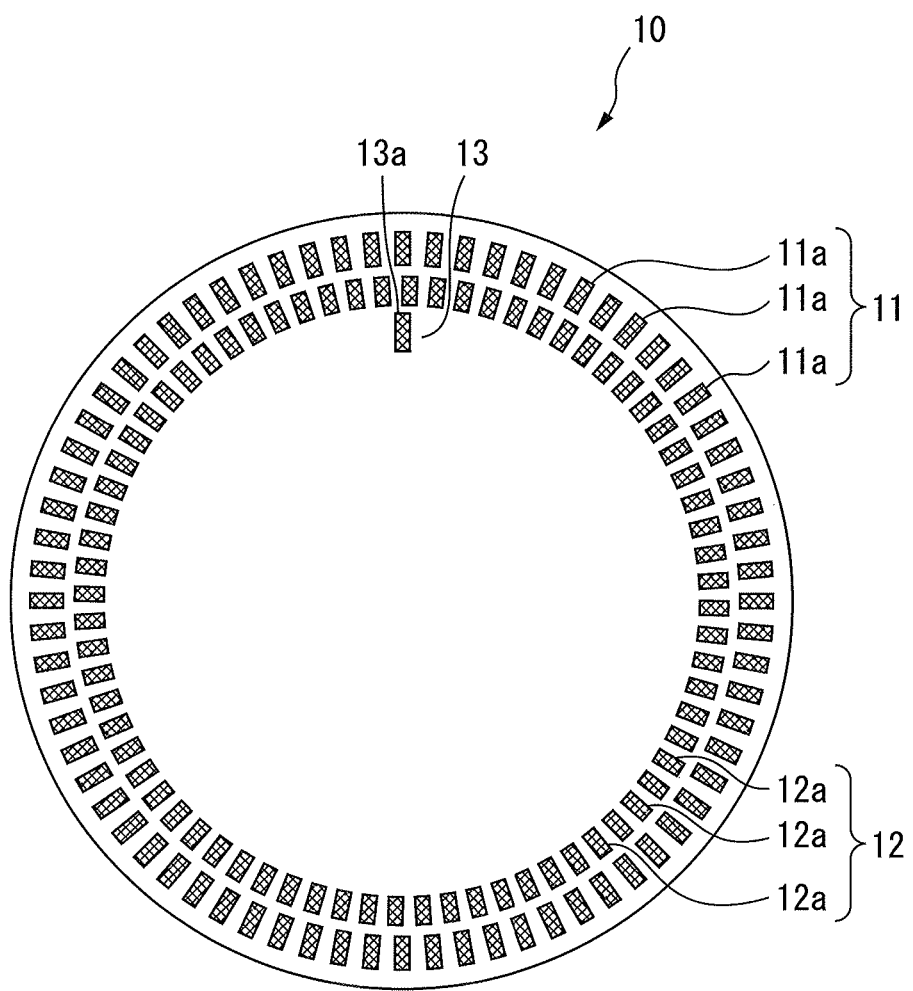
FIG. 2 is a schematic plan view of a rotating plate of the first rotation angle detector in embodiment 1.

FIG. 2 shows a schematic plan view of a rotating plate of the first rotation angle detector in the present embodiment. With reference to FIGS. 1 and 2, the rotating plate 10 has a plurality of track parts to detect the rotation angle of the rotary shaft 15. The rotating plate 10 includes a first track part 11 for generating an A-phase signal and a second track part 12 for generating a B-phase signal. Further, the rotating plate 10 has a third track part 13 for generating a Z-phase signal.

First slits 11a, which are bores circumferentially formed at regular intervals, are formed in the first track part 11. Second slits 12a, which are bores circumferentially formed at regular intervals, are formed in the second track part 12. The first slits 11a and the second slits 12a are deviated from each other in a circumferential direction. For example, the first slits 11a and the second slits 12a are formed so that their phases differs each other by 90° in rotation angle. A third slit 13a is formed in a circumferential direction in the third track part 13.

The rotation angle detector 1 has a light emitting element 17 for emitting light toward the rotating plate 10. The rotation angle detector 1 has a detection unit corresponding to track parts. The detection unit in the present embodiment includes a plurality of detection elements disposed for the corresponding track parts. The detection unit includes a first light receiving element 21, a second light receiving element 22, and a third light receiving element 23, which respectively detect light passing through the slits 11a, 12a, and 13a of the rotating plate 10. The first light receiving element 21 detects the intensity of light varying in the first track part 11 so as to generate an A-phase signal serving as a first signal. The second light receiving element 22 detects the intensity of light varying in the second track part 12 so as to generate a B-phase signal serving as a second signal. The third light receiving element 23 detects the intensity of light varying in the third track part 13 so as to generate a Z-phase signal.

In the present embodiment, a track part for generating an A-phase signal, a track part for generating a B-phase signal, and a track part for generating a Z-phase signal are individually formed in the rotating plate 10. Each track part is formed for the corresponding one of the signals in the rotating plate 10.

The rotation angle detector 1 is provided with a signal processing unit 51 for processing signals generated in the light receiving elements 21, 22, and 23. The signal processing unit 51 is comprised of an arithmetic processing device having, for example, a central processing unit (CPU). An A-phase signal, a B-phase signal, and a Z-phase signal are input to the signal processing unit 51. The signal processing unit 51 includes an angle detecting unit 52 for detecting a rotation angle. The angle detecting unit 52 receives output signals of the first light receiving element 21, the second light receiving element 22, and the third light receiving element 23.

Figure 3:
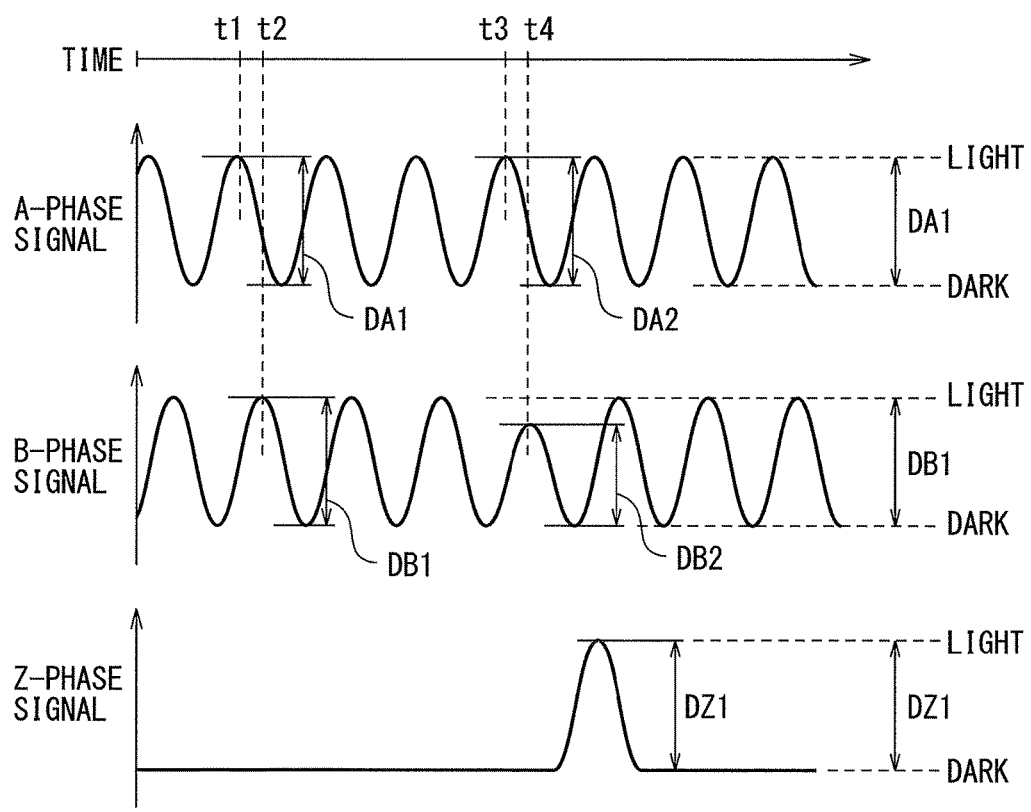
FIG. 3 is a time chart of signals generated in a detecting unit of the first rotation angle detector in embodiment 1.

FIG. 3 shows a time chart of signals received by a signal processing unit. In the first track part 11, the light intensity detected by the first light receiving element 21 increases when light, which has been emitted from the light emitting element 17, passes through the first slits 11a. In this respect, the A-phase signal to be detected increases. Further, light is blocked by portions between the first slits 11a, so that the signal to be detected decreases. The A-phase signal varies in, for example, a substantially sinusoidal waveform. Similar to the A-phase signal, the B-phase signal varies in a substantially sinusoidal waveform. In an example of FIG. 3, the B-phase signal which lags behind the A-phase signal by 90° is detected.

With reference to FIGS. 1 and 3, the angle detecting unit 52 can identify the rotational direction of the rotary shaft 15 by judging whether an A phase is detected prior to a B phase or vice versa. Further, the angle detecting unit 52 can detect the rotation angle of the rotary shaft 15 by counting the number of variations of the A-phase signal or the B-phase signal.

In the third track part 13, light, which has emitted from the light emitting element 17, passes through the third slit 13a every time when the rotary shaft 15 rotates one revolution. Thus, the strength of the Z-phase signal increases every time when the rotary shaft 15 rotates one revolution. The angle detecting unit 52 can detect one revolution of the rotating plate 10 by the Z-phase signal. Further, the angle detecting unit 52 can detect the position of a reference point (the original point).

The signal processing unit 51 outputs the detected rotation angle to an external device 71. Examples of the external device 71 include a control device for a device to which the rotation angle detector 1 is attached. The external device 71 is, for example, a control device for a machine tool or a control device for a robot. The external device 71 can perform a predetermined control based on the detected rotation angle of the rotary shaft 15.

The signal processing unit 51 in the present embodiment includes an abnormality detecting unit 53 for detecting an abnormality of the rotation angle detector 1. The abnormality detecting unit 53 detects the abnormality based on signals generated in the light receiving elements 21, 22, and 23. The abnormality detecting unit 53 in the present embodiment can detect the occurrence of an abnormality in the rotating plate 10. In particular, adhesion of foreign substances to the rotating plate 10 can be detected as an abnormality.

The abnormality detecting unit 53 acquires the A-phase signal as the first signal based on the first track part 11. Further, the abnormality detecting unit 53 acquires the B-phase signal as the second signal based on the second track part 12. The abnormality detecting unit 53 includes a fluctuation range calculating unit 54 for calculating a fluctuation range of the A-phase signal and a fluctuation range of the B-phase signal.

In the present embodiment, in a normal state of the rotation angle detector 1, the difference between the maximum value and the minimum value of the A-phase signal is substantially identical to the difference between the maximum value and the minimum value of the B-phase signal. For example, a fluctuation range DA1 of the A-phase signal in one period starting from a time t1 is substantially identical to a fluctuation range DB1 of the B-phase signal in one period starting from a time t2. The fluctuation range calculating unit 54 in the present embodiment calculates a fluctuation range for each phase. Further, the fluctuation range calculating unit 54 calculates a fluctuation range in each period. Note that, in the present embodiment, fluctuation ranges DA and DB represent the differences between the maximum value and the minimum value of signals. However, the fluctuation ranges are not limited to this embodiment and, for example, as the fluctuation ranges, variables such as amplitudes depending on the maximum value and the minimum value of a signal can be adopted.

When a foreign substance 81 enters into a rotation angle detector, and adheres to a predetermined track part, the strength of a signal decreases. When, for example, the foreign substance 81 adheres to the slits 11a, 12a, and 13a, light to pass through the slits 11a, 12a, and 13a is refracted, and the intensity of light decreases. Alternatively, a part of light is blocked by the foreign substance 81, and the intensity of light decreases. Consequently, the strength of signals generated in the light receiving elements 21, 22, and 23 decreases.

When, for example, the foreign substance 81 adheres to the second track part 12, to block a part of the second slit 12a, the strength of the B-phase signal decreases. With reference to FIG. 3, a fluctuation range DB2 of the B-phase signal starting from a time t4 is smaller than the fluctuation range DB1 in a normal state. Examples of foreign substances to enter the rotation angle detector 1 include liquid foreign substances such as lubrication oil, cutting fluid, etc. of a machine tool and solid foreign substances such as chips etc. generated in a machine tool.

The abnormality detecting unit 53 includes a judgement unit 55 which judges whether an abnormality occurs or not. The judgement unit 55 determines that an abnormality occurs when the difference between the fluctuation range DA of the first signal and the fluctuation range DB of the second signal is larger than a predetermined fluctuation range judgement value. The abnormality detecting unit 53 includes a storage unit 56. The storage unit 56 stores a fluctuation range judgement value in advance.

In an example shown in FIG. 3, the judgement unit 55 calculates the difference in fluctuation range between the A-phase signal and the B-phase signal, which correspond to each other. Namely, the fluctuation ranges of signals in which the phases are shifted with each other by 90° are compared. The judgement unit 55 calculates the difference between the fluctuation range DA1 of the A-phase signal, in which the maximum is obtained at the time t1 and the fluctuation range DB1 of the B-phase signal, in which the maximum value is obtained at the time t2. In this respect, the judgement unit 55 determines that the state is normal because the difference between the fluctuation ranges is small. On the other hand, the judgement unit 55 calculates the difference between the fluctuation range DA2 of the A-phase signal, in which the maximum value is obtained at the time t3 and the fluctuation range DB2 of the B-phase signal, in which the maximum value is obtained at the time t4. In this respect, the calculated difference is large, and exceeds the fluctuation range judgement value. Accordingly, the judgement unit 55 judges that an abnormality occurs in the rotation angle detector 1.

Figure 4:
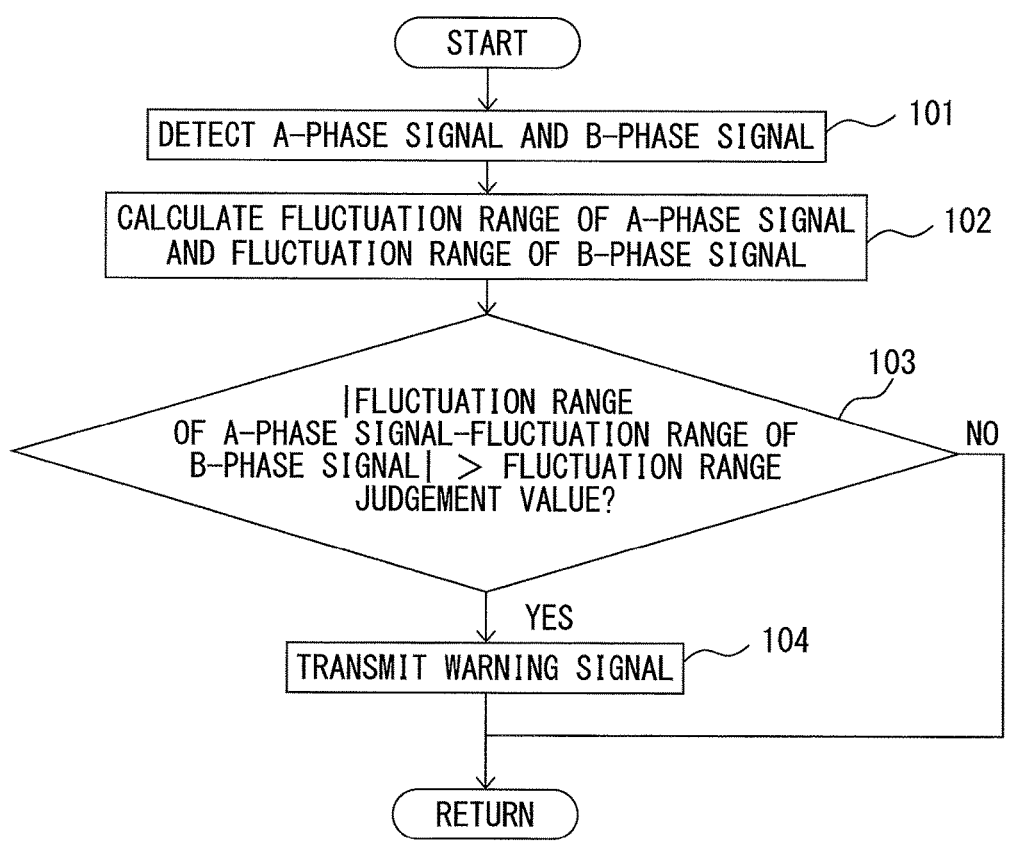
FIG. 4 is a flowchart of control of the first rotation angle detector in embodiment 1.

The abnormality detecting unit 53 transmits a warning signal for informing an abnormality to the external device 71 when the judgement unit 55 judges the occurrence of the abnormality. The external device 71 can display the occurrence of the abnormality on the screen of a display device, or can stop a device provided with the rotation angle detector 1, based on the warning signal, FIG. 4 shows a flowchart of control of a rotation angle detector in the present embodiment. A control operation shown in FIG. 4 can be performed every time, for example, light passes through one of the first slits 11a of the first track part 11, or in each period of a sinusoidal signal generated in a predetermined light receiving element.

In step 101, the abnormality detecting unit 53 detects the A-phase signal and the B-phase signal, which are generated in the first light receiving element 21 and the second light receiving element 22. In step 102, the fluctuation range calculating unit 54 of the abnormality detecting unit 53 calculates the fluctuation range DA of the A-phase signal and the fluctuation range DB of the B-phase signal.

In step 103, the judgement unit 55 calculates the difference (absolute value) between the fluctuation range of the A-phase signal and the fluctuation range of the B-phase signal. The judgement unit 55 judges whether or not the calculated difference is larger than a fluctuation range judgement value. When the difference between the fluctuation range of the A-phase signal and the fluctuation range of the B-phase signal is not greater than the fluctuation range judgement value, it can be judged that an abnormality does not occur. In this case, the control operation is finished.

In step 103, when the difference between the fluctuation range of the A-phase signal and the fluctuation range of the B-phase signal is larger than the fluctuation range judgement value, the control operation proceeds to step 104. In an example shown in FIGS. 1 and 3, the foreign substance 81 adheres to the second track part 12, and accordingly, the fluctuation range of the B-phase signal starting from the time t4 decreases, and it is judged that an abnormality occurs.

In step 104, the abnormality detecting unit 53 transmits a warning signal for informing the occurrence of an abnormality, to the external device 71.

Thus, the abnormality detecting unit 53 can determine that an abnormality occurs based on the difference between the fluctuation ranges of two signals detected by two track parts. The rotation angle detector 1 in the present embodiment can quickly detect the occurrence of an abnormality in a rotating body. When, in particular, there is an entry of a foreign substance, the rotation angle detector 1 can quickly detect the adhesion of the foreign substance. Thus, the possibility of major failures, such as corrosion of parts caused by cutting fluid, or breakage of parts caused by chips, can be quickly detected. A user can perform a proper maintenance operation before a complete failure is achieved in the rotation angle detector.

In the above embodiment, the difference (absolute value) between the fluctuation range of the A-phase signal and the fluctuation range of the B-phase signal is calculated. The abnormality detecting unit 53 may perform a control operation for identifying a phase in which the strength of a signal decreases, among the fluctuation range of the A-phase signal and the fluctuation range of the B-phase signal, in addition to the above control operation. This control operation can identify a track part in which an abnormality occurs. When, for example, the fluctuation range of the A-phase signal is smaller than the fluctuation range of the B-phase signal, it can be judged that an abnormality occurs in the first track part.

In the above embodiment, the fluctuation range calculating unit calculates the difference between the fluctuation ranges of continuous A-phase and B-phase signals, but is not limited to this embodiment. The fluctuation range calculating unit may calculate the difference between the fluctuation ranges of the A-phase signal and the B-phase signal which have a predetermined phase difference. Alternatively, the fluctuation range calculating unit may calculate the difference between the fluctuation ranges, based on a plurality of fluctuation ranges of the A-phase signal and a plurality of fluctuation ranges of the B-phase signal. For example, the fluctuation range calculating unit may calculate the difference between the average value of the fluctuation ranges in a plurality of periods of the A-phase signal and the average value of the fluctuation ranges in a plurality of periods of the B-phase signal.

In the above embodiment, the judgement unit directly calculates the difference between the fluctuation ranges, but the calculation method is not limited to this embodiment. The judgement unit can judge whether or not an abnormality occurs by comparing the magnitude of the fluctuation range of the first signal with the magnitude of the fluctuation range of the second signal. For example, the judgement unit can calculate the ratio between the fluctuation range of the first signal and the fluctuation range of the second signal. The judgement unit may judge that the difference between the fluctuation range of the first signal and the fluctuation range of the second signal is larger than a fluctuation range judgement value, when this ratio exceeds a predetermined judgement value.

In the above embodiment, the A-phase signal is adopted as a first signal and the B-phase signal is adopted as a second signal, but the embodiment is not limited to this. Signals based on different track parts can be adopted as the first signal and the second signal. For example, the B-phase signal may be adopted as the first signal, and the Z-phase signal may be adopted as the second signal.

In the above embodiment, an optical rotation angle detector is described as an example. However, in the present invention, a similar control can be applied to a magnetic rotation angle detector.

Figure 5:
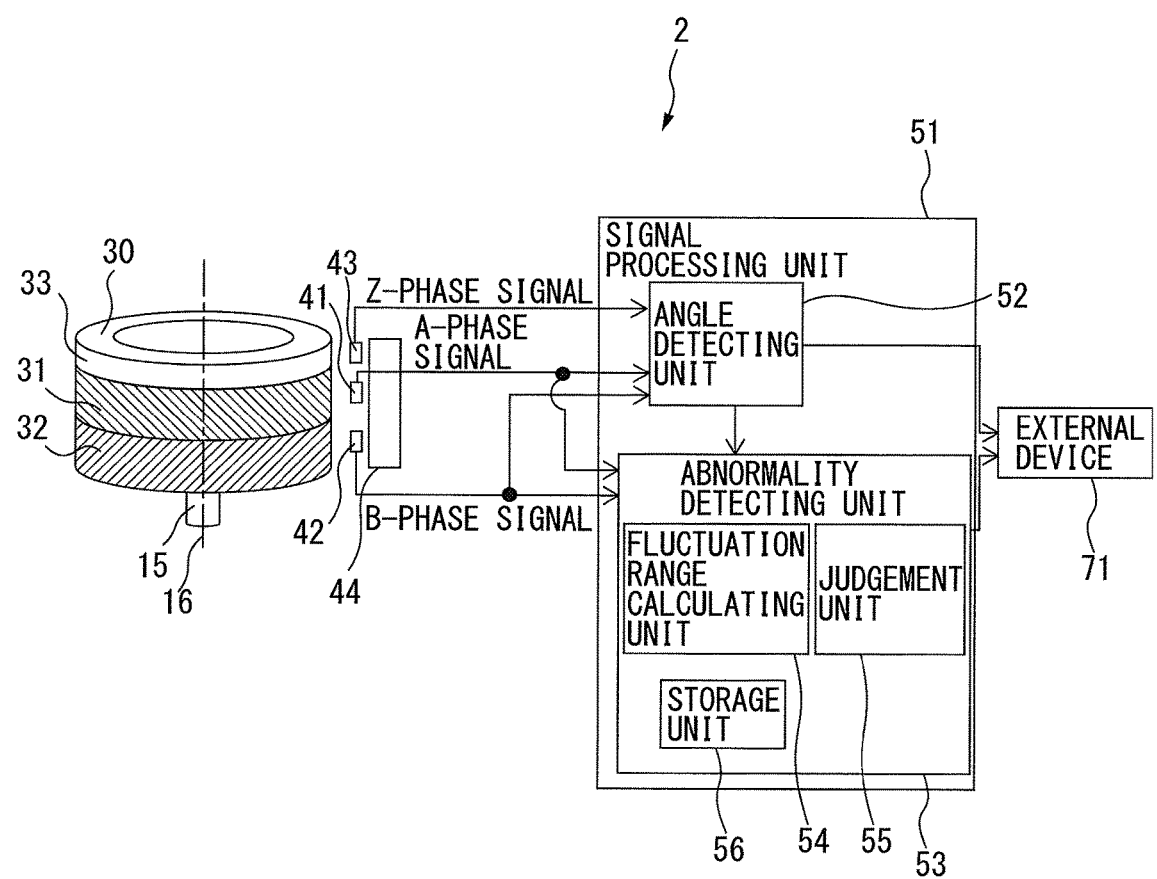
FIG. 5 is a schematic diagram of a second rotation angle detector in embodiment 1.

FIG. 5 shows a schematic diagram of a second rotation angle detector of the present embodiment. A second rotation angle detector 2 is a magnetic rotation angle detector. The second rotation angle detector 2 is provided with a rotary drum 30 serving as a rotating body in which a plurality of track parts are formed. A first track part 31 for generating a first signal, a second track part 32 for generating a second signal, and a third track part 33 are formed in the circumferential side surface of the rotary drum 30.

Figure 6:
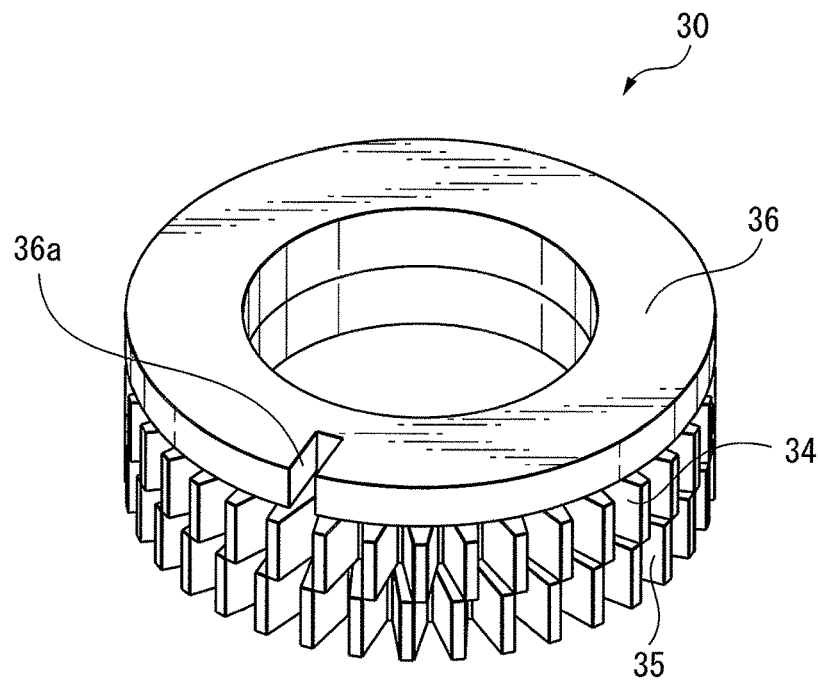
FIG. 6 is a schematic perspective view of a rotary drum of the second rotation angle detector in embodiment 1.

FIG. 6 shows a schematic perspective view of a rotary drum of a second rotation angle detector. The rotary drum 30 is cylindrically shaped. The rotary drum 30 includes a first rotating plate 34 constituting the first track part 31, a second rotating plate 35 constituting the second track part 32, and a third rotating plate 36 constituting the third track part 33. A concave and convex part like gear teeth are formed in the respective peripheral surfaces of the first rotating plate 34 and the second rotating plate 35. The concave and convex part of the first rotating plate 34 and the concave and convex part of the second rotating plate 35 are formed so that they are deviated from each other in the circumferential direction. For example, the concave and convex part of the first rotating plate 34 and the concave and convex part of the second rotating plate 35 are formed so that the phases deviate with each other by 90°. A slit 36a is formed in the third rotating plate 36 in the circumferential direction.

With reference to FIGS. 5 and 6, a detection unit for the track parts includes a first sensor 41, a second sensor 42, and a third sensor 43. The first sensor 41 is opposed to the first track part 31. The second sensor 42 is opposed to the second track part 32. The third sensor 43 is opposed to the third track part 33. A magnet 44 is disposed on one-side of the first sensor 41, the second sensor 42, and the third sensor 43, which is opposite to the rotary drum 30 on the other side. The sensors 41, 42, and 43 are formed so as to detect variations in magnetic flux density in accordance with the shape of the track parts. Each sensor can output a voltage corresponding to the magnetic flux density, using, for example, a magnetic resistance element in which the resistance value varies depending on the magnetic flux density.

The first sensor 41 outputs an A-phase signal, and the second sensor 42 outputs a B-phase signal. Further, the third sensor 43 outputs a Z-phase signal. In the magnetic rotation angle detector, similar to the optical rotation angle detector, the A-phase signal, the B-phase signal, and the Z-phase signal are detected (see FIG. 3). For example, the B-phase signal in which the phase is shifted from the A-phase signal by 90° is detected.

Regarding the magnetic rotation angle detector 2, signals similar to those of the optical rotation angle detector 1 can be acquired. The configuration of the signal processing unit 51 of the rotation angle detector 2 is similar to the configuration of the signal processing unit of the first rotation angle detector 1 (see FIG. 1). With a control operation similar to that of the first rotation angle detector 1, the A-phase signal, the B-phase signal, and the Z-phase signal can be processed in the signal processing unit 51. Further, the abnormality detecting unit 53 can detect the occurrence of an abnormality in the rotation angle detector 2.

Note that examples of the magnetic rotation angle detector are not limited to the above embodiment, and include any magnetic rotation angle detector having a rotating body. For example, a magnetic element is attached to each track part of the rotating body. In each track part, the south pole and the north pole are spaced at a regular interval in the circumferential direction. Further, a plurality of sensors may be arranged so as to be opposed to the corresponding track parts.

Embodiment 2

With reference to FIGS. 7 to 11, a rotation angle detector in embodiment 2 will be described below. In the present embodiment, an optical rotation angle detector is adopted and explained, but a magnetic rotation angle detector can be adopted. The configuration of a rotating body and a detection unit of a first rotation angle detector in the present embodiment is similar to the configuration of those of the first rotation angle detector in embodiment 1 (see FIGS. 1 and 2). The rotation angle detector in the present embodiment detects the phase of a foreign substance adhering to a rotating body, to perform a control operation.

Figure 7:
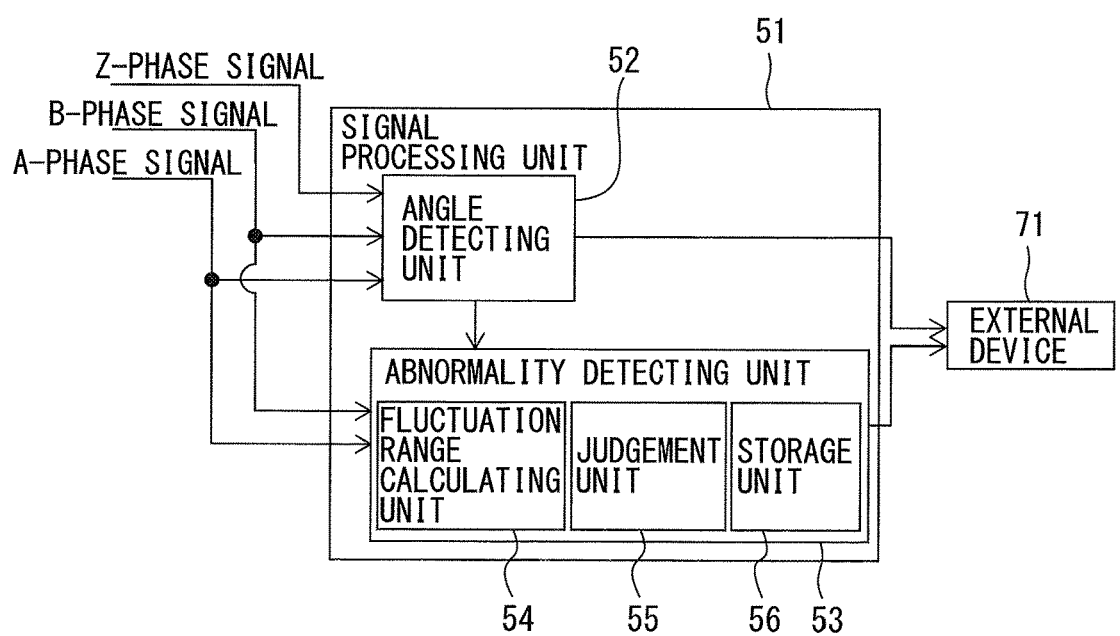
FIG. 7 is a block diagram of a signal processing unit of a first rotation angle detector in embodiment 2.

FIG. 7 shows a block diagram of a signal processing unit of a first rotation angle detector in the present embodiment. The angle detecting unit 52 in the present embodiment functions as a phase detecting unit for detecting a phase. An A-phase signal, a B-phase signal as well as a Z-phase signal are input to the angle detecting unit 52.

The angle detecting unit 52 detects the reference position (original point) of the rotary shaft 15 based on the Z-phase signal. Further, the angle detecting unit 52 counts the number of periods of the A-phase signal or the B-phase signal so as to detect the position of the rotary shaft 15 within one revolution. Namely, the angle detecting unit 52 detects the phase of the rotary shaft 15 within one revolution. The phase detected by the angle detecting unit 52 is transmitted to the abnormality detecting unit 53.

In the judgement unit 55 in the present embodiment, when the difference between the fluctuation range of a first signal and the fluctuation range of a second signal exceeds a fluctuation range judgement value, a phase which exceeds the fluctuation range judgement value is transmitted to the storage unit 56. The storage unit 56 stores the phase. The judgement unit 55 judges whether or not the difference between the fluctuation range of the first signal and the fluctuation range of the second signal exceeds a fluctuation range judgement value in the same phase when the rotary shaft 15 rotates more than once. Further, the judgement unit 55 determines that an abnormality occurs in the rotation angle detector 1 when the difference exceeds the fluctuation range judgement value in the same phase.

Figure 8:
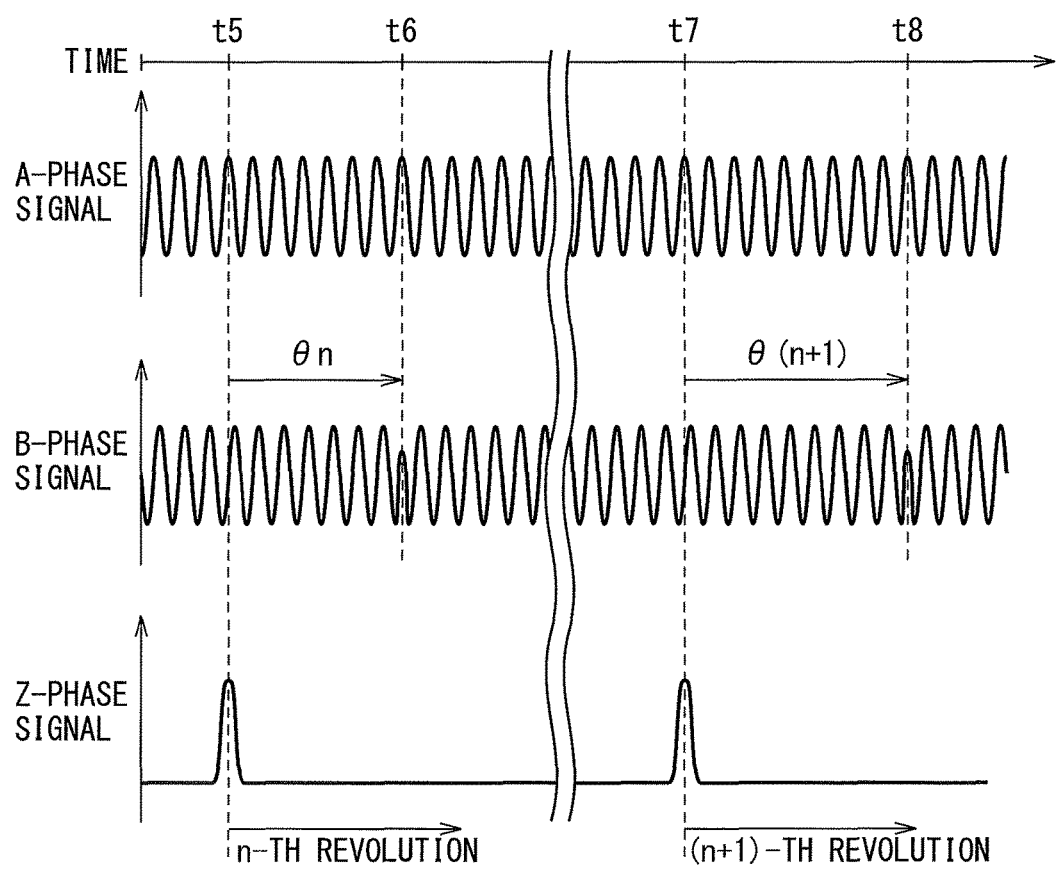
FIG. 8 is a time chart of signals generated in a detecting unit of the first rotation angle detector in embodiment 2.

FIG. 8 shows a time chart of signals detected by a first rotation angle detector in the present embodiment. In the present embodiment, the judgement unit 55 judges whether or not the difference between the fluctuation ranges exceeds the fluctuation range judgement value in every period of the A-phase signal and every period of the B-phase signal. The judgement unit 55 acquires a phase from the angle detecting unit 52 when the difference exceeds the fluctuation range judgement value. The judgement unit 55 judges whether or not the phase which exceeds the fluctuation range judgement value has been previously stored in the storage unit 56. When the phase which exceeds the fluctuation range judgement value has been previously stored, the judgement unit 55 judges whether or not the acquired phase is identical to the phase which has been previously stored in the storage unit 56. When these phases are identical, it is judged that an abnormality occurs.

In an example shown in FIG. 8, in the present revolution (n-th revolution) of the rotary shaft 15, a Z-phase signal is detected at a time t5, and a reference point is set. The judgement unit 55 detects, at a time t6, that the difference between the fluctuation range of the A-phase signal and the fluctuation range of the B-phase signal exceeds the fluctuation range judgement value. Further, the storage unit 56 stores a phase θn at the time t6.

In the subsequent revolution ((n+1)-th revolution) of the rotary shaft 15, the Z-phase signal is detected at a time t7, and a reference point is set. The judgement unit 55 detects, at a time t8, that the difference between the fluctuation range of the A-phase signal and the fluctuation range of the B-phase signal exceeds the fluctuation range judgement value. The judgement unit 55 judges whether or not the phase θn at the time t6 is identical to a phase θ(n+1) at the time t8. When, for example, the difference between the phase θn and the phase θ(n+1) is smaller than a predetermined phase difference, the judgement unit 55 judges that these phases are identical. Further, the judgement unit 55 judges that an abnormality occurs in the rotation angle detector when the phase θn and the phase θ(n+1) are identical.

Thus, the rotation angle detector in the present embodiment judges that an abnormality occurs in the rotation angle detector when the phase which exceeds the fluctuation range judgement value in the present revolution is identical to the phase which exceeds the fluctuation range judgement value in the subsequent revolution. Namely, the judgement unit 55 judges that an abnormality occurs when the fluctuation range judgement value is exceeded in the same phase in two continuous revolutions of the rotary shaft 15.

Note that the control operation of the judgement unit 55 is not limited to this embodiment. The occurrence of an abnormality may be judged when the difference between the fluctuation ranges continuously exceeds a fluctuation range judgement value in the same phase, in a predetermined number of revolutions, i.e., three or more revolutions.

The rotation angle detector in the present embodiment can prevent a normal state from being judged as an abnormal state depending on errors of detected signals. Namely, the rotation angle detector in the present embodiment can suppress an incorrect judgement from being made. For example, a foreign substance which has temporarily adhered is quickly removed in some cases. In such a case, the difference between the fluctuation range of the first signal and the fluctuation range of the second signal temporarily exceeds a fluctuation range judgement value, but this state quickly returns to a normal state. In such a case, a judgement in which an abnormality occurs in the rotation angle detector can be avoided.

The rotation angle detector in the present embodiment is required to detect the phase of a rotary shaft. The configuration to detect the phase of a rotary shaft is not limited to the device shown in FIG. 1, and any configuration which can detect a phase can be adopted.

Figure 9:
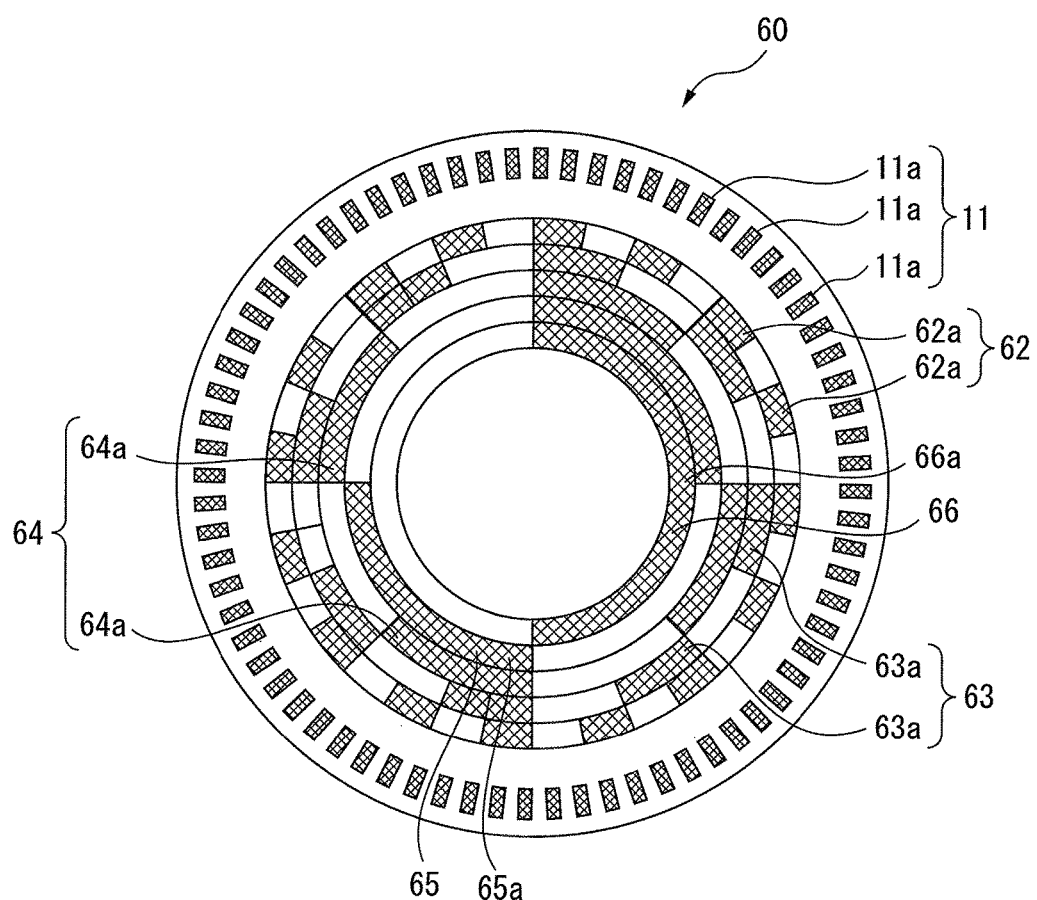
FIG. 9 is a schematic plan view of a rotating plate of a second rotation angle detector in embodiment 2.

FIG. 9 shows a schematic plan view of a rotating plate of a second rotation angle detector in the present embodiment. A rotating plate 60 includes a first track part 11 for generating an A-phase signal. Further, the rotating plate 60 includes a plurality of track parts 62 to 66 for detecting a phase. In such track parts 62 to 66, slits 62a, 63a, 64a, 65a, and 66a which have different patterns are formed. Further, in the rotation angle detector, a plurality of light receiving elements are arranged for the corresponding track parts. Such a type of rotation angle detector which can detect the phase of the rotary shaft 15 is also referred to as an absolute rotation angle detector. In the present embodiment, based on the patterns of the slits 62a, 63a, 64a, 65a, and 66a of the track parts 62 to 66, signals generated in the light receiving element are referred to as absolute-phase signals.

Figure 10:
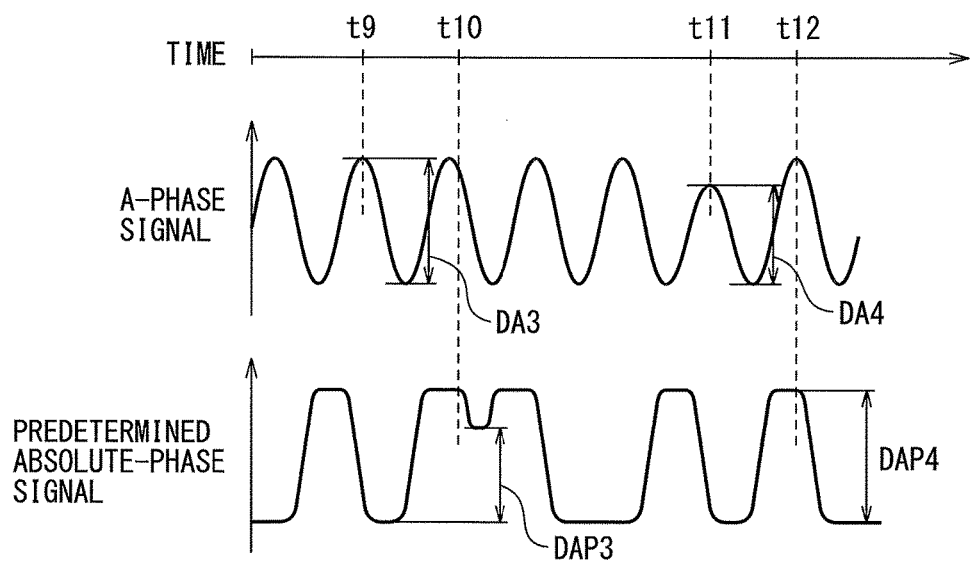
FIG. 10 is a time chart of signals generated in a detecting unit of the second rotation angle detector in embodiment 2.

FIG. 10 shows a time chart of signals detected by a second rotation angle detector in the present embodiment. With reference to FIGS. 9 and 10, in a predetermined track part to generate an absolute-phase signal, long slits are formed in the circumferential direction. In, for example, the track part 63, the slits 63a which are longer than the first slits 11a in the circumferential direction are formed. A predetermined absolute-phase signal does not have a sinusoidal waveform, and has a waveform having sections in which the maximum value of the signal is maintained and sections in which the minimum value of the signal is maintained.

When a foreign substance adheres to any of the track parts 62 to 66 for generating absolute-phase signals, portions in which the strength of the signal decreases arise in the sections in which the maximum value is maintained. In this respect, the fluctuation range calculating unit 54 can calculate a fluctuation range DAP3 of a predetermined absolute-phase signal, based on the strength of the signal when the strength decreases.

In an example shown in FIG. 10, the fluctuation range calculating unit 54 calculates a fluctuation range DA3 of the A-phase signal which decreases from a time t9 as a starting point and a fluctuation range DAP3 of a predetermined absolute-phase signal which reduces from a time t10 as a starting point. Further, the judgement unit 55 can determine that an abnormality occurs based on the difference between the fluctuation ranges in two tracks.

FIG. 10 shows that a foreign substance adheres to the first track part 11. A fluctuation range DA4 of the A-phase signal which decreases from a time t11 as a starting point is smaller than a normal fluctuation range. The judgement unit 55 can detect the occurrence of an abnormality based on the difference between the fluctuation range DA4 and a fluctuation range DAP4 of a predetermined absolute-phase signal which decreases from a time t12 as a starting point.

Figure 11:
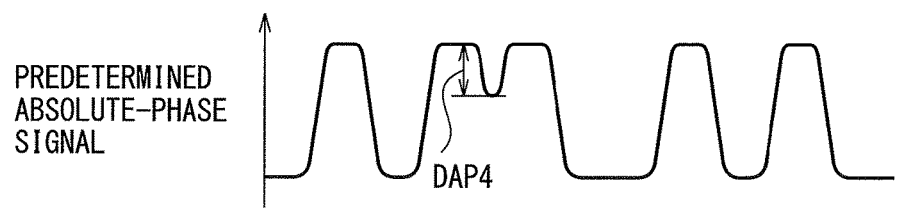
FIG. 11 is another time chart of signals generated in a detecting unit of the second rotation angle detector in embodiment 2.

FIG. 11 shows a time chart of a predetermined absolute-phase signal detected in a second rotation angle detector in the present embodiment. As shown in FIG. 11, the fluctuation range calculating unit 54 may detect a reduction magnitude from the maximum value of a signal as the fluctuation range DAP4, i.e., the fluctuation range when a predetermined absolute-phase signal reduces.

As described above, an abnormality in a rotating body can be detected based on the fluctuation range of the A-phase signal and the fluctuation range of a predetermined absolute-phase signal. Further, a plurality of track parts 62 to 66 are formed in order to generate absolute-phase signals. An abnormality of the rotation angle detector may be detected by selecting any two of these track parts 62 to 66, and using signals corresponding to the selected track parts.

Other configurations, operations, and effects of this embodiment are similar to those of embodiment 1, and accordingly, will not be described here.

Embodiment 3

Figure 12:
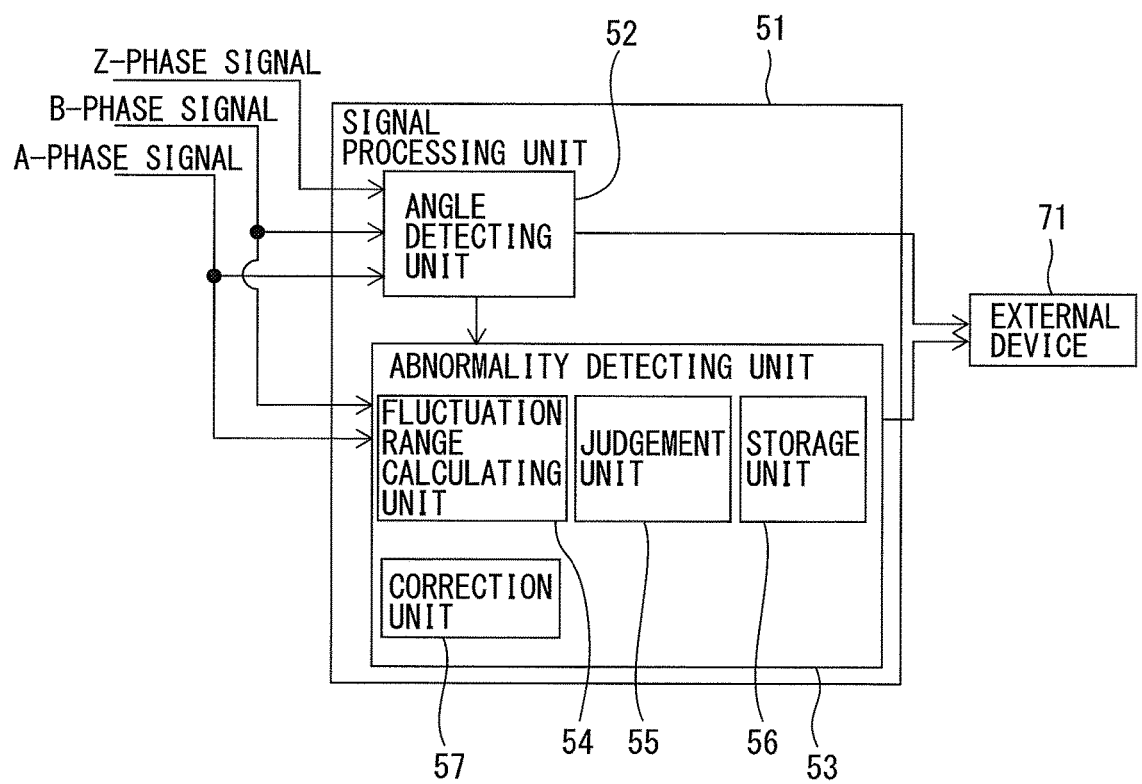
FIG. 12 is a block diagram of a signal processing unit of a rotation angle detector in embodiment 3.
Figure 13:
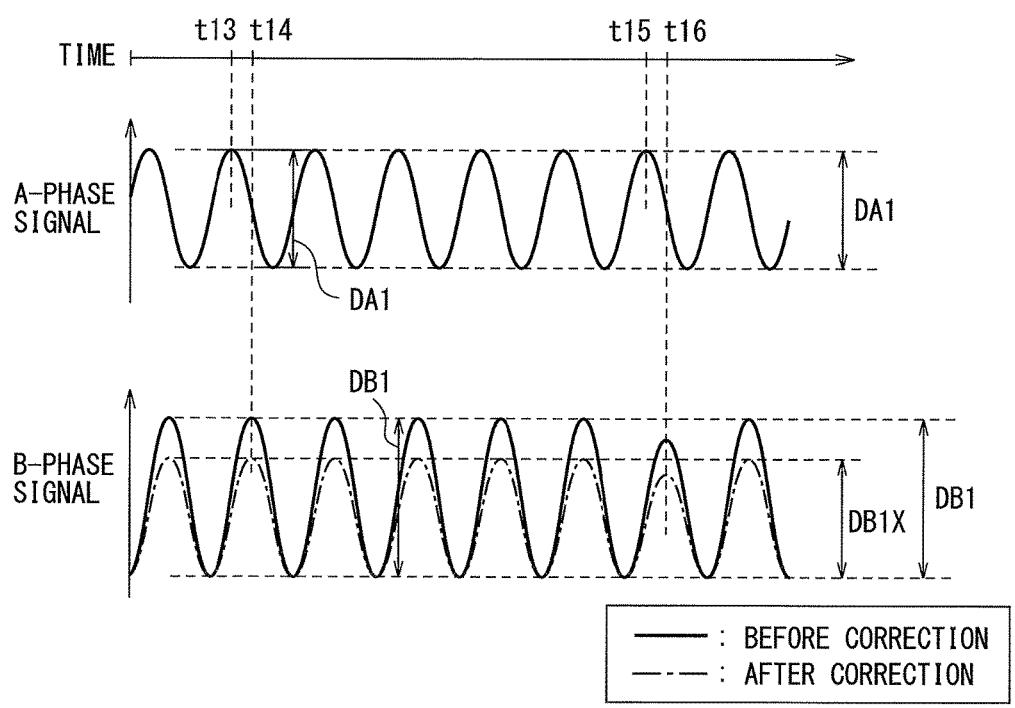
FIG. 13 is a time chart of signals corrected in a correcting unit of the rotation angle detector in embodiment 3.

With reference to FIGS. 12 and 13, a rotation angle detector in embodiment 3 will be described below. In the present embodiment, an optical rotation angle detector is adopted and explained, but a magnetic rotation angle detector can be adopted. The configuration of a rotating body and a detection unit of a rotation angle detector in the present embodiment is similar to the configuration of those of the first rotation angle detector in embodiment 1 (see FIGS. 1 and 2). The rotation angle detector in the present embodiment corrects the detected signal.

FIG. 12 shows a block diagram of a signal processing unit of a rotation angle detector in the present embodiment. The abnormality detecting unit 53 is provided with a correction unit 57 for correcting signals generated in a detection unit. The correction unit 57 in the present embodiment corrects a A-phase signal generated in the first light receiving element 21 and a B-phase signal generated in the second light receiving element 22.

FIG. 13 shows a time chart of signals detected in a rotation angle detector in the present embodiment. Even when the rotation angle detector is in a normal state, in signals based on the plurality of track parts 11 to 13, the fluctuation ranges of the signals are different from each other in some cases. In an example shown in FIG. 13, when the rotation angle detector is in a normal state, the fluctuation range of the B-phase signal is larger than the fluctuation range of the A-phase signal. For example, the fluctuation range DB1 of the B-phase signal starting from a time t14 is larger than the fluctuation range DA1 of the A-phase signal starting from a time t13. There is originally a difference between the fluctuation ranges, and accordingly, the judgement unit 55 cannot make an accurate judgement in some cases, when the difference between the fluctuation range of the A-phase signal and the fluctuation range of the B-phase signal is compared with a fluctuation range judgement value.

With reference to FIGS. 12 and 13, the correction unit 57 in the present embodiment corrects signals so that, when the rotation angle detector is in a normal state, the fluctuation range of the A-phase signal is identical to the fluctuation range of the B-phase signal. The correction unit 57 corrects at least one of the fluctuation range of the A-phase signal and the fluctuation range of the B-phase signal. The storage unit 56 stores beforehand a correction value to cause the fluctuation range of the A-phase signal and the fluctuation range of the B-phase signal to be identical to each other when the rotation angle detector is in a normal state. Examples of the correction value include a ratio of the fluctuation range of the B-phase signal to the fluctuation range of the A-phase signal or a difference between the fluctuation range of the A-phase signal and the fluctuation range of the B-phase signal.

The correction unit 57 uses the correction value so as to correct signals actually detected by the detection unit. In the present embodiment, a fluctuation range DB of the B-phase signal is corrected. For example, the correction unit 57 can make a correction by multiplying the fluctuation range DB by a predetermined ratio of the fluctuation range. The correction made by the correction unit 57 can cause a fluctuation range DB1X of the B-phase signal to be identical to a fluctuation range DA1 of the A-phase signal when the rotation angle detector is in a normal state.

The judgement unit 55 makes a judgement based on the fluctuation range of the A-phase signal and the fluctuation range of the B-phase signal after correction by the correction unit 57. In an example shown in FIG. 13, the correction unit 57 corrects the fluctuation range of the B-phase signal starting from a time t16. Further, the judgement unit 55 can judge the occurrence of an abnormality based on the difference between the corrected fluctuation range and the fluctuation range of the A-phase signal starting from a time t15.

The rotation angle detector in the present embodiment can make an accurate judgement to correct signals detected in the correction unit.

Note that, in the above embodiment, the B-phase signal as a second signal is corrected, but the embodiment is not limited to this. The A-phase signal as a first signal may be corrected. Further, both the A-phase signal and the B-phase signal may be corrected.

Other configurations, operations, and effects of this embodiment are similar to those of embodiments 1 and 2, and accordingly, will not be described here.

The present invention can provide a rotation angle detector which can detect the entry of a foreign substance.

In the above control operations, the order of steps can be appropriately changed without changing the functions and operations. Further, the above embodiments can be combined. In the above drawings, the same or corresponding portions are designated with the same reference numerals. Note that the above embodiments are examples, and do not limit the invention. Further, the embodiments include modifications of aspects described in the claims.

The invention claimed is:

1. A rotation angle detector comprising:
a rotating body including a plurality of track parts to detect a rotation angle of a rotary shaft;
detection units arranged in positions which correspond to the track parts; and
an abnormality detecting unit for detecting an abnormality based on signals generated in the detection units, wherein
the rotating body includes a first track part and a second track part,
the detection units generate a first signal based on the first track part and a second signal based on the second track part, and
the abnormality detecting unit includes a fluctuation range calculating unit for calculating a fluctuation range of the first signal and a fluctuation range of the second signal, and a judgement unit for judging an occurrence of an abnormality when a difference between the fluctuation range of the first signal and the fluctuation range of the second signal is larger than a predetermined fluctuation range judgement value, wherein the abnormality detecting unit compares the fluctuation range of the first signal with the fluctuation range of the second signal and determines that the abnormality occurs in one of the first track part or the second track part based on the comparison.

2. The rotation angle detector according to claim 1, further comprising a phase detecting unit for detecting a phase within one revolution of the rotary shaft, wherein
the abnormality detecting unit detects the phase in which the difference between the fluctuation range of the first signal and the fluctuation range of the second signal exceeds the fluctuation range judgement value, and
the judgement unit judges the occurrence of an abnormality when the difference between the fluctuation range of the first signal and the fluctuation range of the second signal exceeds the fluctuation range judgement value in the same phase when the rotary shaft rotates more than once.

3. The rotation angle detector according to claim 1, wherein
the abnormality detecting unit includes a correction unit for correcting signals generated in the detection units, and a storage unit for storing beforehand a correction value which causes the fluctuation range of the first signal and the fluctuation range of the second signal to be identical to each other when the rotation angle detector is in a normal state,
the correction unit uses the correction value so as to correct at least one fluctuation range among the fluctuation range of the first signal and the fluctuation range of the second signal, and
the judgement unit makes a judgement based on the first signal and the second signal after correction.

* * * * *